United States Patent [19]
Kuraoka et al.

[11] Patent Number: 4,770,462
[45] Date of Patent: Sep. 13, 1988

[54] ARRANGEMENTS FOR CONCEALING WINDSHIELD WIPERS OF AUTOMOBILES

[75] Inventors: Koji Kuraoka, Higashihiroshima; Takeshi Yamamoto; Hisao Fukutomi, both of Hiroshima, all of Japan

[73] Assignee: Mazda Motor Corporation, Japan

[21] Appl. No.: 49,585

[22] Filed: May 14, 1987

[30] Foreign Application Priority Data

May 20, 1986 [JP] Japan ................. 61-115842

[51] Int. Cl.$^4$ .................. B60S 1/04; B62J 9/02; B62D 25/08
[52] U.S. Cl. .................. 296/192; 296/84 R; 15/250.17
[58] Field of Search ............ 296/192, 84 R; 15/250.16, 250.17, 250.19, 250 R; 49/73

[56] References Cited

U.S. PATENT DOCUMENTS

| | | | |
|---|---|---|---|
| 2,895,157 | 7/1959 | Kocourek | 296/192 |
| 2,936,477 | 5/1960 | Feller | 15/250.19 |
| 3,225,376 | 12/1965 | Heiler | 15/250.19 |
| 3,226,756 | 1/1966 | Heiler | 15/250.19 |
| 3,290,715 | 12/1966 | Heiler | 15/250.19 |
| 3,314,195 | 4/1967 | Ziegler | 296/84 R |
| 3,418,677 | 12/1968 | Goodale | 15/250.19 |
| 3,601,839 | 8/1971 | Kato | 15/250.19 |
| 3,688,332 | 9/1972 | Bellware | 15/250.19 X |
| 3,694,846 | 10/1972 | Parker | 15/250.16 |
| 4,283,085 | 8/1981 | Sacco et al. | 296/84 R |

FOREIGN PATENT DOCUMENTS

| | | |
|---|---|---|
| 57-33557 | 2/1982 | Japan . |
| 57-158555 | 10/1982 | Japan . |
| 60-68849 | 5/1985 | Japan . |
| 60-131450 | 9/1985 | Japan . |
| 824893 | 12/1959 | United Kingdom ........ 15/250.16 |

Primary Examiner—Dennis H. Pedder
Attorney, Agent, or Firm—Gerald J. Ferguson, Jr.

[57] ABSTRACT

An arrangement for concealing a windshild wiper of an automobile comprises a structural portion for forming a hollow space for receiving the windshield wiper in a body of the automobile, a cover structure including a pair of plate members each provided for covering the hollow space and mounted on the body to be rotatable and movable up and down, a cover support mechanism for supporting the cover structure so as to cause the plate members selectively to be placed at respective first operating positions with their respective outer surfaces succeeding smoothly to an outer surface of an exterior panel member, such as a hood, and extending contiguously for closing the hollow space containing the windshield wiper and to be moved to get partially under the exterior panel member to be placed at respective second operating positions for opening the hollow space, and a driving device for driving the cover structure through the cover support mechanism to keep the plate members in the respective first operating positions when the windshield wiper is in an inoperative state and to keep the said plate members in the respective second operating positions when the windshield wiper operates. When the plate members are kept in the respective first operating positions, the windshield wiper placed in the hollow space is concealed.

26 Claims, 4 Drawing Sheets

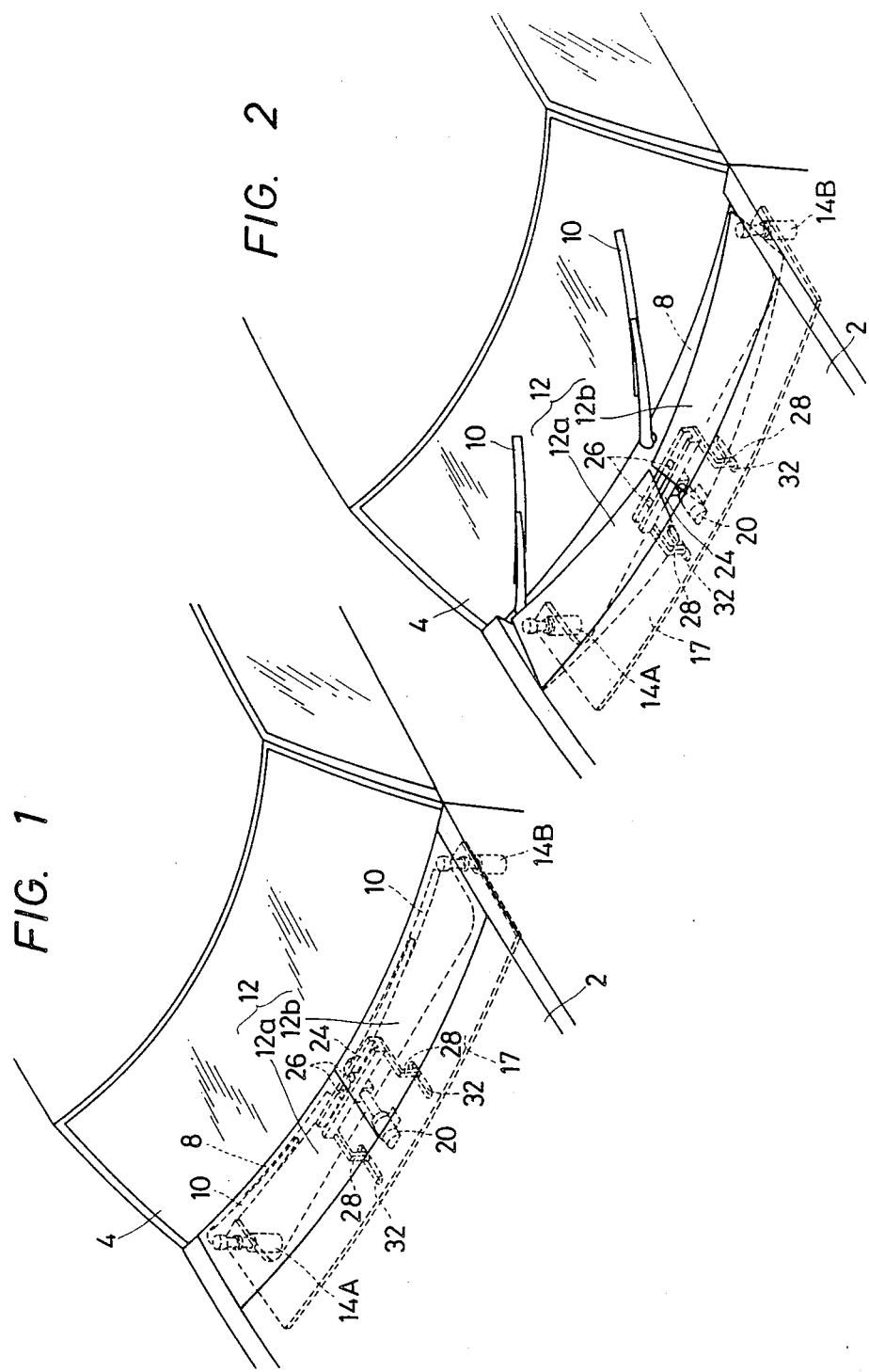

ARRANGEMENTS FOR CONCEALING WINDSHIELD WIPERS OF AUTOMOBILES

BACKGROUND OF THE INVENTION

1. Field of the Invention

The present invention relates generally to arrangements for concealing windshield wipers of automobiles, and more particularly, to an arrangement for putting a windshield wiper in a hollow space provided for receiving wipers between a rear end of a hood panel and a lower end of a windshield in a body of an automobile and covering the hollow space in which the windshield wiper is contained so that the windshield wiper is concealed.

2. Description of the Prior Art

Although there has been commonly used in automobiles a windshield wiper which has a wiper arm provided with a wiper blade and is mounted to be swingable on a cowl panel located between a hood panel and a front windshield in a body of an automobile so as to work on the front windshield, a so-called windshield wiper of the full-concealed type has been also proposed. The windshield wiper of the full-concealed type is put in a hollow space formed for receiving wipers between a rear end of a hood panel and a lower end of a front windshield in a body of an automobile when it is in an inoperative state. The windshield wiper of the full-concealed type contained in the hollow space for receiving wipers does not appear in a front view of the automobile, and therefore the windshield wiper of the full-concealed type makes a contribution to a good appearance of the automobile.

However, the automobile equipped with the windshield wiper of the full-concealed type is required to have a relatively large opening which is formed with a predetermined width between a lower portion of the front windshield and the rear end of the hood panel in the body so as to extend along the front windshield in the direction of the width of the body and connected to the hollow space for receiving wipers in which the windshield wiper being in the inoperative state is put. In this connection, to provide the automobile with such an opening formed between the lower portion of the front windshield and the rear end of the hood panel in the body brings about disadvantages that the appearance of the automobile in the sight seen from the front windshield to a front end of the body is spoiled by the opening and a loud wind noise is liable to be produced at the opening when the automobile is in a travelling state.

For the purpose of avoiding the above-mentioned disadvantages that occur in the case of the automobile equipped with the windshield wiper of the full-concealed type, it has been proposed, as disclosed in, for example, the Japanese utility model application published before examination under publication number 57-158555, to provide a lid for covering the hollow space for receiving wipers which is formed between the rear end of the hood panel and the lower end of the front windshield in the body and receives the windshield wiper of the full-concealed type. The lid is operative to close the opening provided between the hood panel and the front windshield in the body for permitting the wiper arm to be put therethrough into the hollow space for receiving wiper arms when the windshield wiper of the full-concealed type is in the inoperative state.

In an arrangement for concealing the windshield wiper provided with such a lid, the lid is fixed at its central portion to one end of a link member which is supported to be rotatable through a pin by a support member planted on a cowl panel forming a bottom portion of the hollow space for receiving wiper arms and engaged at its portion deviated to the hood panel from its central portion with the cowl panel through a spring so as to be caused to tend to open the hollow space for receiving wiper arms. When the windshield wiper of the full-concealed type is in the inoperative state and put in the hollow space for receiving wipers, the other end of the link member which has one end thereof connected to the central portion of the lid is restricted from moving by the windshield wiper coming into contact therewith, so that the lid keeps closed the hollow space for receiving wipers in opposition to the resilient force by the spring.

In the case of the previously proposed arrangement for concealing the windshield wiper of the automobile which is provided with the hollow space for receiving wipers in the body of the automobile and the lid for covering the hollow space as described above, since the windshield wiper comes directly into contact with the link member connected to the lid so as to restrain the same from moving in opposition to the resilient force by the spring when it is put in the hollow space for receiving wipers, the resilient force by the spring acts on the windshield wiper continuously through the lid and the link member when the windshield wiper is put is the hollow space for receiving wipers. This results in that each of the operation of the windshield wiper for wiping the front windshield and the operation of the lid for opening and closing the hollow space for receiving wipers is deteriorated in reliability. In addition, since a portion of the lid positioned against the front windshield projects upward from the level of the hood panel and a relatively large opening is formed between the hood panel and the front windshield in the body when the lid is operated to open the hollow space for receiving wipers, the appearance of the automobile is spoiled at a portion of the body between the hood panel and the front windshield. Further, the portion of the lid projecting upward from the level of the hood panel is kept in an unsupported state when the lid is operated to open the hollow space for receiving wiper, the lid is apt to the fluttered undesirably by wind during the travelling of the automobile.

OBJECTS AND SUMMARY OF THE INVENTION

Accordingly, it is an object of the present invention to provide an arrangement for concealing a windshield wiper of an automobile which avoids the aforementioned problems and disadvantages encountered with the prior art.

Another object of the present invention is to provide an arrangement for concealing a windshield wiper of an automobile, in which a hollow space provided for receiving wipers between an exterior panel member and a windshield in a body of the automobile is closed by a cover structure so that the windshield wiper is concealed when the windshield wiper is in an unoperative state and put in the hollow space and opened with movements of the cover structure when the windshield wiper operates in such a manner that the appearance of the automobile is not spoiled and any portion of the cover structure is not fluttered during the travelling of the automobile under a condition wherein the cover structure keeps the hollow space opened.

A further object of the present invention is to provide an arrangement for concealing a windshield wiper of an automobile, in which a hollow space provided for receiving wipers between an exterior panel member and a windshield in a body of the automobile is closed by a cover structure so that the windshield wiper is concealed when the windshield wiper is in an inoperative state and put in the hollow space and opened with movements of the cover structure when the windshield wiper operates in such a manner that the operation of the windshield wiper is not harmfully influenced by the cover structure and the operation of the cover structure is reliably performed.

According to the present invention, there is provided an arrangement for concealing a windshield wiper of an automobile comprising a structural portion for forming a hollow space for receiving the windshield wiper between an exterior panel member and a windshield in a body of the automobile, a cover structure including a pair of separate plate members which are positioned over the hollow space to be capable of being disposed with respective ends facing each other in the direction along the width of the body of the automobile so as to cover the hollow space and each of which is mounted on the body of the automobile to be rotatable on an axis provided at one end portion thereof and movable up and down to the body, a cover support mechanism for supporting the cover structure so as to cause the same selectively to be in a closing condition for closing the hollow space and to be in an open condition for opening the hollow space, and a driving device for driving the cover structure through the cover support mechanism to keep the cover structure in the closing condition so that the windshield wiper is concealed when the windshield wiper is in an inoperative state and put in the hollow space and also to keep the cover structure in the open condition when the windshield wiper operates. The plate members included in the cover structure kept in the closing condition are placed at respective first operating positions to have their respective outer surfaces which succeed smoothly to an outer surface of the exterior panel member and extend contiguously between the exterior panel member and the windshield so as to close the hollow space, and then each of the plate members is moved down and rotated on the axis provided at its one end portion to cause a portion thereof to get under the exterior panel member so as to be placed at a second operating position so that the cover structure is kept in the open condition.

With the arrangement thus constituted in accordance with the present invention, the cover structure is controlled through the cover support mechanism by the driving device so as to cause the plate members to close the hollow space in which the windshield wiper is contained so that the windshield wiper is concealed when the windshield wiper is in the inoperative state and to open the hollow space when the windshield wiper operates. The operation of the plate members for opening and closing the hollow space is conducted under a situation wherein the cover structure is supported by the cover support mechanism so as not to engage with the windshield wiper and therefore performed reliably without exerting any harmful influence on the operation of the windshield wiper.

When the hollow space is closed by the cover structure, the plate members are placed at the respective first operating positions to be disposed with their respective ends facing each other in the direction along the width of the body of the automobile to have their respective outer surfaces which succeed smoothly to the outer surface of the exterior panel member and extend contiguously between the exterior panel member and the windshield so as to cover the hollow space, and therefore a fine appearance of the automobile is obtained at a portion of the body including the external panel member and the windshield. Then, when the hollow space is opened, the windshield wiper enters into and leaves from the hollow space freely to wipe the windshield properly. Further, in such a situation, since the plate members are placed at the respective second operating positions to be located under the exterior panel member of the body and the cover structure does not have any portion projecting upward from the level of the exterior panel member, the appearance of the automobile is not spoiled at the portion of the body including the external panel member and the windshield and the cover structure avoids flutters during the travelling of the automobile.

The above, and other objects, features and advantages of the present invention will become apparent from the following detailed description which is to be read in conjunction with the accompanying drawings.

BRIEF DESCRIPION OF THE DRAWINGS

FIGS. 1 and 2 are schematic illustrations each showing one embodiment of arrangement for concealing a windshield wiper of an automobile according to the present invention;

DESCRIPTION OF THE PREFERRED EMBODIMENT

The invention will now be described by way of example with reference to the accompanying drawings.

FIGS. 1 to 4 shows one embodiment of arrangement for concealing a windshild wiper of an automobile according to the present invention, together with a part of a body of an automobile to which the embodiment is applied.

Figure 3:
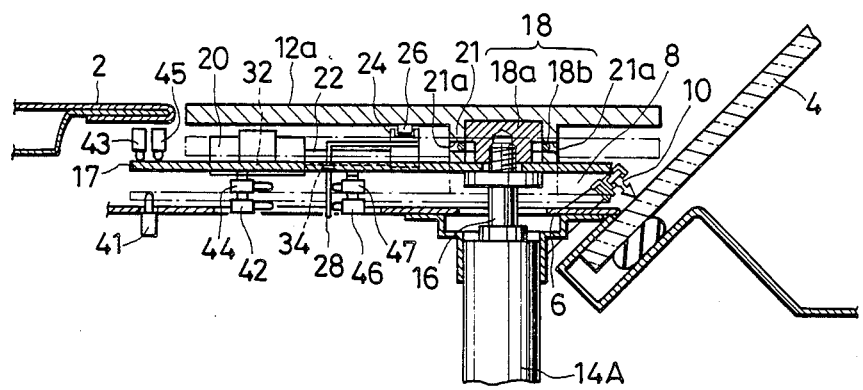
FIGS. 3 and 4 are sectional views each showing an essential portion of the embodiment shown in FIGS. 1 and 2.

Referring to FIGS. 1 to 4, a cowl-top-outer member 6 (shown in FIGS. 3 and 4), which is provided between a rear end of a hood panel 2 and a lower end of a front windshield 4 for constituting a cowl portion extending in the direction of the width of the body, forms a hollow space 8 for receiving wipers at a location in the vicinity of the lower end of the front windshield 4. A pair of windshield wipers 10 are put in the hollow space 8, as shown in FIGS. 1 and 3, when they are in an inoperative state.

Above the hollow space 8, a cover structure 12 is provided for covering the hollow space 8 in which the windshield wipers 10 are contained. The cover structure 12 includes a pair of separate plate members 12a and 12b which are positioned above the hollow space 8 to be capable of being disposed with respective ends facing each other in the direction of the width of the body so as to close the hollow space 8, as shown in FIGS. 1 and 3. A corner portion of the plate member 12a located to be adjacent to the front windshield 4 at the right side of the body is attached on the side of the under surface thereof to an actuator 14A for moving the plate member 12a upward and downward, and a corner portion of the plate member 12b located to be adjacent to the front windshield 4 at the left side of the body is attached on the side of the under surface thereof to an actuator 14B for moving the plate member 12b upward and downward.

Figure 4:
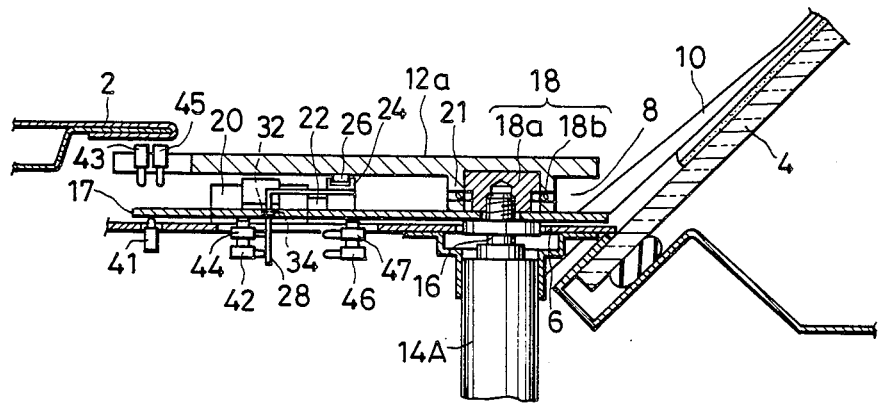

Each of the actuators 14A and 14B is constructed in a common manner. As represented by the actuator 14A shown in FIGS. 3 and 4, each of the actuators 14A and 14B is mounted on the cowl-top-outer member 6 forming the hollow space 8 and provided with a plunger 16. The plunger 16 of the actuator 14A is engaged through a connecting device 18 with the plate member 12a to support the same to be rotatable, and the plunger 16 of the actuator 14B is engaged through the connecting device 18 with the plate member 12b to support the same to be rotatable. The connecting device 18 comprises a stepped nut 18a engaged with the top of the plunger 16 and a ring spring 18b surrounding a lower portion of the stepped nut 18a having a relatively small diameter. The stepped nut 18a and ring spring 18b are inserted into a tubular receiving portion 21, which projects from the under surface of each of the plate members 12a and 12b with cutouts 21a opposite to each other, to cause a portion of the ring spring 18b to engage with the cutouts 21a, so that each of the plate members 12a and 12b is engaged with the plunger 16 so as to be rotatable and to be prevented from shifting along an axis of the plunger 16. Each of the actuators 14A and 14B is operative to push the plunger 16 upward so that the cover structure 12 is placed at an ascended position where each of the plate members 12a and 12b constituting the cover structure 12 is located to have its outer surface succeeding smoothly to the outer surface of the hood panel 2 and extending from the same, as shown in FIGS. 1 and 3, and further operative to pull the plunger 16 downward so that the cover structure 12 is placed at a descended position where each of the plate members 12a and 12b constituting the cover structure 12 is located to be lower than the hood panel 2, as shown in FIGS. 2 and 4.

Below the plate members 12a and 12b included in the cover structure 12, a support plate 17 which extends in the direction of the width of the body and is provided at both end portions with a couple of holes into which the plungers 16 of the actuators 14A and 14B are loosely inserted, respectively, is disposed. The support plate 17 moves to ascend and descend together with the plate members 12a and 12b and the plungers 16 moving up and down.

An actuator 20 with a plunger 22 for moving the plate members 12a and 12b to open and close the hollow space 8 is mounted on the central portion of the support plate 17 to be operative to cause the plunger 22 to expand and contract in the direction of the length of the body. The end portion of the plunger 22 is connected to a central portion of a guide rail 24 extending in the direction of the width of the body and having a channel-shaped cross section. A pair of guide rollers 26 attached to be rotatable to the under surfaces of the plate members 12a and 12b at their respective end portions distant from their corner portions attached to the actuators 14A and 14B, respectively, are engaged with the guide rail 24 to be guided thereby. Further, each of a pair of supplemental arm members 28 is fixed at its one end to each of end portions of the guide rail 24 for assisting the guide rail 24 in moving properly in the direction of the length of the body. At the other end of each of the supplemental arm members 28, a sliding guide 34 is provided for engaging with rotatable for engaging with a guiding hole 32 formed on the support plate 17 to extend in the direction of the length of the body.

The actuator 20 is operative to push the plunger 22 out and to pull the plunger 22 in selectively when the cover structure 12 including the plate members 12a and 12b is placed at the descended position. When the cover structure 12 is placed at the descended position and the plunger 22 is pushed out, the plate members 12a and 12b are rotated in respective directions opposite to each other so as to be placed at respective first operating positions. The plate members 12a and 12b placed at the respective first operating positions are disposed with their respective ends getting near mutually to face each other at the central portion of the body in the direction of the width of the body. In such a case, the plate members 12a and 12b are rotated with rotation axes provided on the actuators 14A and 14B, respectively, under guidance by the guide rail 24, guide roller 26, supplemental arm member 28, and guiding hole 32 inclusive. Further, when the cover structure 12 is moved up to be placed at the ascended position after the plate members 12a and 12b are rotated, the hollow space 8 is closed by the cover structure 12 as shown in FIG. 1. On the other hand, when the cover structure 12 is placed at the descended position and the plunger 22 is pulled in, the plate members 12a and 12b are rotated in another respective directions opposite to each other so as to be placed at respective second operating positions. The plate members 12a and 12b placed at the respective second operating positions are positioned to cause their respective portions located near the hood panel 2 to get under the hood panel 2 and inevitably to cause their respective ends located near the front windshield 4 to go away from the front windshield 4, so that the hollow space 8 is opened, as shown in FIG. 2. In this case also, the plate members 12a and 12b are rotated with rotation axes provided on the actuators 14A and 14B, respectively, under guidance by the guide rail 24, guide roller 26, supplemental arm member 28, and guiding hole 32 inclusive.

With the structural arrangement described above, a cover support mechanism, which supports the cover structure 12 so as to cause each of the plate members 12a and 12b to be placed at the first operating position and the second operating position selectively and to move up and down, is constituted by the actuators 14A and 14B, connecting devices 18, support plate 17, guide rail 24, guide rollers 26, supplemental arm members 28, guiding holes 32 and so on, and a driving device which drives the cover support mechanism so as to cause the cover structure 12 to close and open the hollow space 8 selectively is constituted by the actuators 14A, 14B and 20 and so on.

Figure 5:
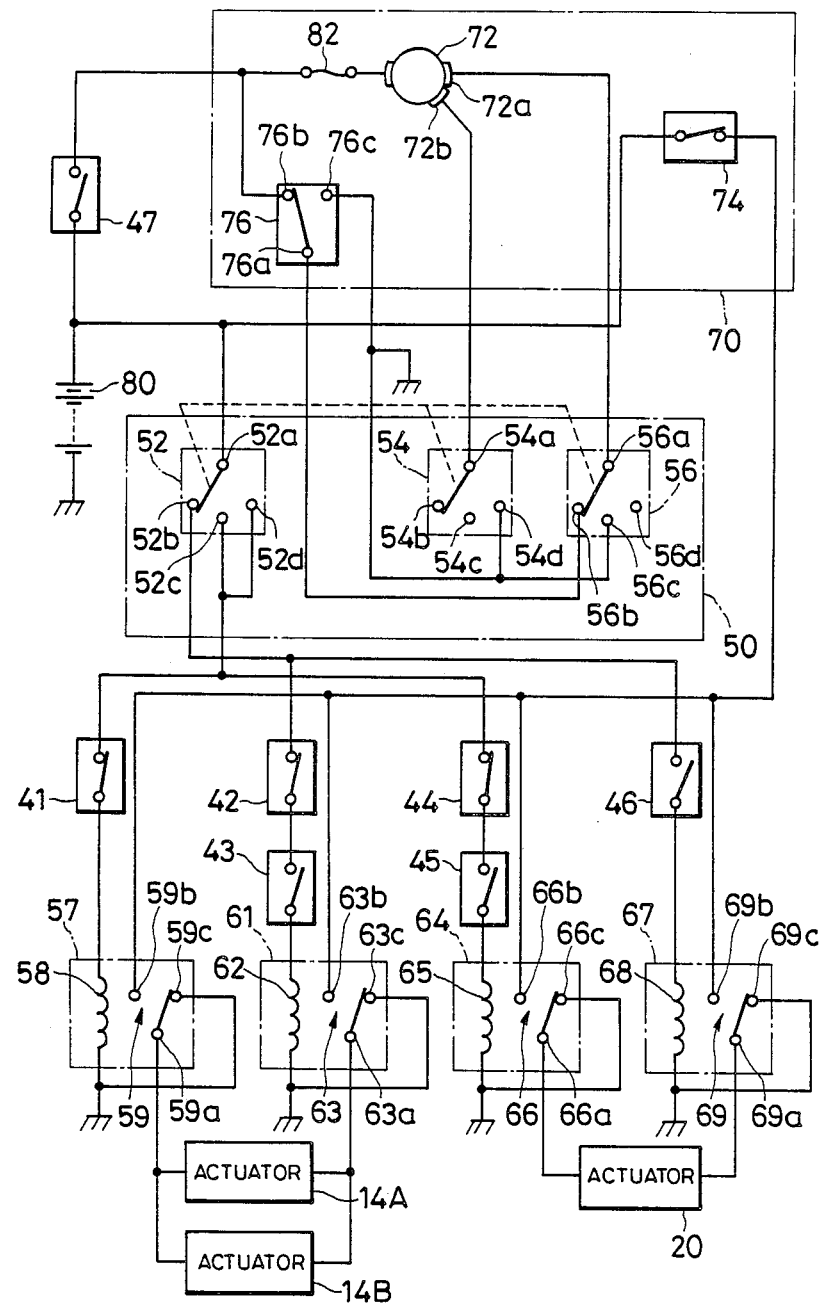
FIG. 5 is a circuit diagram showing equivalently an example of a driving control device for controlling operations for driving windshield wipers and a cover structure used in the embodiment shown in FIGS. 1 and 2.

In such an arrangement as aforementioned, each of the actuators 14A, 14B and 20 operates in response to the operation of the windshield wiper 10, and FIG. 5 shows a part of an example of a driving control device for controlling operations for driving the windshield wipers 10 and the actuators 14A, 14B and 20.

Referring to FIG. 5, a wiper switch unit 50 which may be disposed in a cabin space formed in the body comprises switch elements 52, 54 and 56 operating in synchronism with one another. In the switch elements 52, 54 and 56, movable contacts 52a, 54a and 56a are connected simultaneously with selective contacts 52b, 54b and 56b respectively, with selective contacts 52c and 54c respectively, or with selective contacts 52d, 54d and 56d respectively. When the movable contact 52a is connected with the selective contact 52b in the switch element 52, each of the windshield wipers 10 is kept inoperative. On the other hand, when the movable contact 52a is connected with the selective contact 52c or 52d in the switch element 52, each of the windshield wipers 10 is operated at low speed or high speed, respectively.

For driving the windshield wipers 10, a wiper driving section 70 is provided. The wiper driving section 70 includes a wiper driving motor 72, a wiper position detecting switch element 74 which is kept in an ON state when the windshield wipers 10 are put in the hollow space 8, a stopping switch element 76 which is operative to move the windshield wipers 10 into the hollow space 8 and then causes the windshield wipers 10 to cease operating automatically when the windshield wipers 10 in process of operation are to be stopped, and a breaker 82. The wiper driving motor 72 is provided with a brush 72a for low speed revolution and a brush 72b for high speed revolution.

In connection with the actuators 14A, 14B and 20, switch elements 41 to 46 and electromagnetic relays 57, 61, 64 and 67 which are operated selectively in response to operating conditions of the switch elements 41 to 46 are provided. As shown in FIGS. 3 and 4, the switch elements 41, 43 and 45 are controlled to be in the ON state and OFF state selectively by the support plate 17 which moves up and down together with the cover structure 12. The switch element 41 is set to be in the ON state when the cover structure 12 is placed at the ascended position and to be in the OFF state when the cover structure 12 is placed at the descended position. Each of the switch elements 43 and 45 is set to be in the ON state when the cover structure 12 is placed at the descended position and to be in the OFF state when the cover structure 12 is placed at the ascended position. Further, as shown also in FIGS. 3 and 4, the switch elements 42, 44 and 46 are controlled to be in the ON state and OFF state selectively by the supplemental arm members 28 which is moved by the plunger 22 of the actuator 20. Each of the switch elements 42 and 44 is set to be in the ON state when the plunger 22 is pushed out and to be in the OFF state when the plunger 22 is pulled in, and the switch element 46 is set to be in the ON state when the plunger 22 is pulled in and to be in the OFF state when the plunger 22 is pushed out.

The electromagnetic relays 57, 61, 64 and 67 have their respective exciting coils 58, 62, 65 and 68 connected to the switch elements 41, 43, 45 and 46, respectively. The electromagnetic relays 57 and 61 have respectively switches 59 and 63 between which the actuators 14A and 14B are connected in parallel with each other. Besides, the electromagnetic relays 64 and 67 have respectively switches 66 and 69 between which the actuator 20 is connected.

Further, a switch element 47 is connected between a battery 80 and the breaker 82 in the wiper driving section 70. As shown in FIGS. 3 and 4, the switch element 47 is controlled to be in the ON state and OFF state selectively by, for example, the supplemental arm members 28 moved by the plunger 22 in such a manner as to be in the ON state when the plunger 22 is pulled in and to be in the OFF state when the plunger 22 is pushed out.

With the circuit configuration thus constituted, in the case where the windshield wipers 10 are put in the hollow space 8 and the hollow space 8 containing the windshield wipers 10 is closed by the cover structure 12, the above mentioned switch elements and electromagnetic relays are set in the manner shown in FIG. 5. In such a case, the plunger 16 of each of the actuators 14A and 14B is kept being pushed out and the plunger 22 of the actuator 20 is also is also kept being pushed out. Further, the wiper driving motor 72 is kept inoperative.

Then, when the windshield wipers 10 are caused to operate at low speed, the movable contacts 52a, 54a and 56a of the switch elements 52, 54 and 56 are connected with the selective contacts 52c, 54c and 56c, respectively. As a result, a current from the battery 80 flows through the switch elements 52 and 41 and the exciting coil 58 in the electromagnetic relay 57 and thereby a movable contact 59a of the switch 59 in the electromagnetic relay 57 is switched to be connected with the selective contact 59b. In this case, since the wiper position detecting switch element 74 provided in the wiper driving section 70 is kept in the ON state, a current from the battery 80 flows through the wiper position detecting switch element 74, the switch 59 in the electromagnetic relay 57, the actuators 14A and 14B, and the switch 63 in the electromagnetic relay 61, and thereby each of the actuators 14A and 14B is operated. Each of the actuators 14A and 14B is operative to pull the plunger 16 in, and therefore the cover structure 12 is shifted to the descended position, as shown with a dot-dash line in FIG. 3 and shown also in FIG. 4. When the cover structure 12 is moved into the descended position, the switch element 41 is turned off by the support plate 17 which is moved down together with the cover structure 12 and thereby the current flowing through the exciting coil 58 in the electromagnetic relay 57 is switched off, so that the movable contact 59a of the switch 59 in the electromagnetic relay 57 is shifted to be connected with the selective contact 59c. Accordingly, the current flowing through the actuators 14A and 14B is switched off and thereby the plunger 16 of each of the actuators 14A and 14B is kept being pulled in.

Simultaneously, the switch element 45 is turned on by the support plate 17. Accordingly, a current from the battery 80 flows through the switch elements 52, 44 and 45 and the exciting coil 65 in the electromagnetic relay 64 and thereby a movable contact 66a of the switch 66 in the electromagnetic relay 64 is switched to be connected with the selective contact 66b. Consequently, a current from the battery 80 flows through the wiper position detecting switch element 74, the switch 66 in the electromagnetic relay 64, the actuator 20 and the switch 69 in the electromagnetic relay 67, and thereby the actuator 20 is operated.

The actuator 20 operates to pull the plunger 22 in, and thereby the plate members 12a and 12b constituting the cover structure 12 are rotated in respective directions opposite to each other with the rotation axes provided on the plungers 16 of the actuators 14A and 14B, respectively, under the guidance by the guide rail 24, guide rollers 26, supplemental arm members 28 and guiding holes 32 inclusive, so as to cause their respective portions located near the hood panel 2 to get under the hood panel 2 to be placed at the respective second operating positions. This results in that the cover structure 12 is in the open condition for opening the hollow space 8 containing the windshield wipers 10.

When the cover structure 12 is set to be in the open condition, the switch element 44 is turned off by the supplemental arm member 28 which is moved by the plunger 22 of the actuator 20. Therefore, the current flowing through the exciting coil 65 in the electromagnetic relay 64 is switched off and the movable contact 66a of the switch 66 in the electromagnetic relay 64 is switched to be connected with the selective contact 66c. Consequently, the current flowing through the actuator 20 is switched of and thereby the plunger 22 of the actuator 20 is kept being pulled in.

Further, the switch element 47 is also turned on by the supplemental arm member 28. Accordingly, a current from the battery 80 flows through the switch element 47, the breaker 82, the wiper driving motor 72, the brush 72a for low speed revolution of the wiper driving motor 72, the movable contact 56a of the switch element 56 and the selective contact 56c of the switch element 56, and thereby the wiper driving motor 72 revolves at low speed. As a result, each of the windshield wipers 10 operates to wipe the front windshield 4 at low speed.

In the operation described above, the stopping switch element 76, which is provided in the wiper driving section 70 with a movable contact 76a and selective contacts 76b and 76c, operates in such a manner that the movable contact 76a is connected with the selective contact 76c when the windshield wipers 10 are out of the hollow space 8 and with the selective contact 76b when the windshield wipers 10 are put in the hollow space 8.

In the case where the windshield wipers 10 are caused to operate at high speed, the movable contacts 52a, 54a and 56a of the switch elements 52, 54 and 56 are connected with the selective contacts 52d, 54d and 56d, respectively. As a result, a current from the battery 80 flows through the switch element 47, the breaker 82, the wiper driving motor 72, the brush 72b for high speed revolution of the wiper driving motor 72, the movable contact 54a of the switch element 54 and the selective contact 54d of the switch element 54, and thereby the wiper driving motor 72 revolves at high speed. As a result, each of the windshield wipers 10 operates to wipe the front windshield 4 at high speed.

In the event of stopping the windshield wipers 10, the movable contacts 52a, 54a and 56a of the switch elements 52, 54 and 56 are connected with the selective contacts 52b, 54b and 56b, respectively. Then, the movable contact 76a of the stopping switch element 76 maintains connection with the selective contact 76c until the windshield wipers 10 in process of operating are positioned in the hollow space 8, and the current from the battery 80 flows through the switch element 47, the breaker 82, the wiper driving motor 72, the brush 72a for low speed revolution of the wiper driving motor 72, the movable contact 56a of the switch element 56 and the selective contact 56c of the switch element 56, and thereby the wiper driving motor 72 keeps revolving at low speed.

After that, when the windshield wipers 10 are positioned in the hollow space 8, the movable contact 76a of the stopping switch element 76 is switched to be connected to the selective contact 76b and thereby the current flowing through the wiper driving motor 72 is switched off. Consequently, each of the windshield wipers 10 is ceased operating to be put in the hollow space 8.

When the windshield wipers 10 are put in the hollow space 8 in such a manner as mentioned above, the wiper position detecting switch element 74 provided in the wiper driving section 70 is turned on.

In such a situation, since the movable contact 52a of the switch element 52 is connected with the selective contact 52b in the wiper switch unit 50 and the switch element 46 is in the ON state because the cover structure 12 is in the open condition for opening the hollow space 8, a current from the battery 80 flows through the switch element 52, the switch element 46 and the exciting coil 68 in the electromagnetic relay 67. Accordingly, a movable contact 69a of the switch 69 in the electromagnetic relay 67 which is connected with a selective contact 69c is turned to be connected with a selective contact 69b, and a current from the battery 80 flows through the wiper position detecting switch element 74, the switch 69 in the electromagnetic relay 67, the actuator 20 and the switch 66 in the electromagnetic relay 64, so that the actuator 20 is operated to push the plunger 22 out.

In accordance with such a movement of the plunger 22 of the actuator 20, the plate members 12a and 12b constituting the cover structure 12 are rotated in respective directions opposite to each other with the rotation axes provided on the plungers 16 of the actuators 14A and 14B, respectively, under the guidance by the guide rail 24, guide rollers 26, supplemental arm members 28 and guiding holes 32 inclusive, so as to be placed at the respective first operating positions. When each of the plate members 12a and 12b is placed at the first operating position, the switch element 46 is turned off by the supplemental arm member 28 which is moved together with the plate members 12a and 12b. Therefore, the current flowing through the exciting coil 65 in the electromagnetic relay 64 is switched off and the movable contact 66a of the switch 66 in the electromagnetic relay 64 is turned to be connected with the selective contact 66c. As a result, the current flowing through the actuator is switched off and thereby the plunger 22 of the actuator 20 is kept being pushed out.

Further, since both the switch elements 42 and 43 are turned on, a current from the battery 80 flows through the switch element 52, the switch element 42 and 43 and the exciting coil 62 in the electromagnetic relay 61. Accordingly, a movable contact 63a of the switch 63 in the electromagnetic relay 61 is connected with a selective contact 63b, and a current from the battery 80 flows through the wiper position detecting switch element 74, the switch 63 in the electromagnetic relay 61, the actuators 14A and 14B and the switch 59 in the electromagnetic relay 57, so that each of the actuators 14A and 14B is operated to push the plunger 16 out.

In accordance with such movements of the plungers 16 of the actuators 14A and 14B, the cover structure 12 including the plate members 12a and 12b is moved up to be placed at the ascended position. When the cover structure 12 is placed at the ascended position, the plate members 12a and 12b have their respective outer surfaces which succeed smoothly to the outer surface of the hood panel 2 and extend contiguously between the hood panel 2 and the front windshield 4 so as to cover the hollow space 8. This results in that the cover structure 12 is in the closing condition for closing the hollow space 8 containing the windshield wipers 10.

As described above, the switch element 43 is turned off by the support plate 17 which is moved up together with the cover structure 12 when the cover structure 12 is placed at the ascended position, and the current flowing through the exciting coil 62 in the electromagnetic relay 61 is switched off and thereby the movable contact 63a of the switch 63 in the electromagnetic relay 61 is connected to the selective contact 63c, so that the plunger 16 of each of the actuators 14A and 14B is kept being pushed out and therefore the cover structure 12 is kept in the closing condition.

Figure 6A:
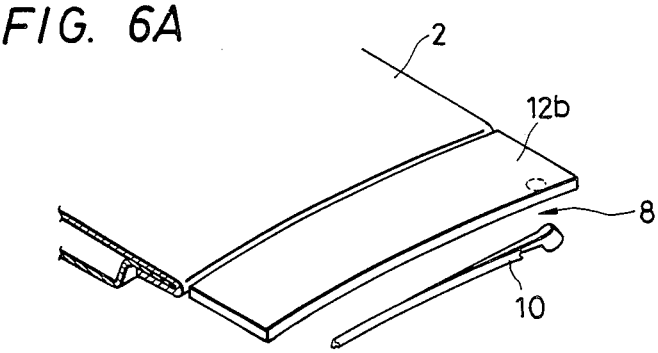
FIGS. 6A, 6B and 6C are schematic illustrations used for explaining the operation of the cover structure used in the embodiment shown in FIGS. 1 and 2.
Figure 6B:
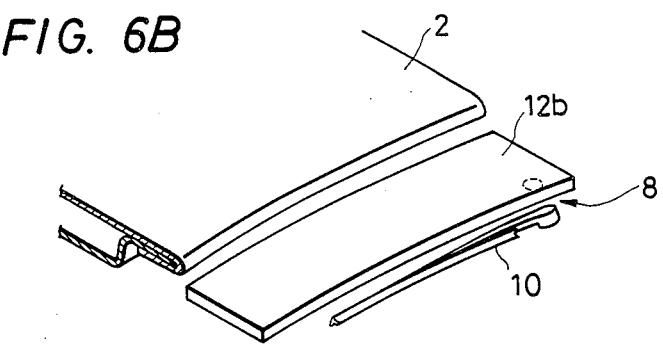
Figure 6C:
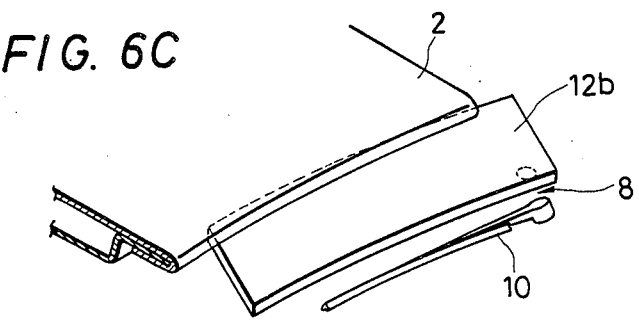

In the aforementioned operation of the cover structure 12 for opening and closing the hollow space 8, the positional relation between the cover structure 12 and the hood panel 2 is varied as shwon in FIGS. 6A, 6B and 6C in which the cover structure 12 is represented by the plate member 12b.

Referring to FIGS. 6A, 6B and 6C, when the windshield wiper 10 is in the inoperative state and put in the hollow space 8, the plate member 12b is positioned above the windshield wiper 10 to cover the hollow space 8 as shown in FIG. 6A. In this situation, the outer surface of the plate member 12b succeeds smoothly to the outer surface of the hood panel 2 and extends between the hood panel 2 and the front windshield 4. At the moment immediately before the start of the operation of the windshield wiper 10, the plate member 12b is moved down to be lower than the rear end of the hood panel 2, as shown in FIG. 6B. Then, the plate member 12b is further moved so as to cause a portion thereof located near the hood panel 2 to get under the hood panel 2 and inevitably to cause an end portion thereof located near the front windshield 4 to go away from the front windshield 4, so that the hollow space 8 is opened, as shown in FIG. 6C. After that, the windshield wiper 10 commences operating.

In the case where the windshield wiper 10 which is in process of operation is caused to be in the inoperative state, each of the plate member 12b and the windshield wiper 10 operates contrary to the above in order.

What is claimed is:

1. An arrangement for concealing a windshield wiper of an automobile comprising, a structural portion for forming a hollow space for receiving the windshield wiper between an exterior panel member and a windshield in a body of the automobile, a cover structure including a pair of separate plate members which are positioned over the hollow space to be capable of being arranged close to each other in the direction of the width of the body so as to cover the hollow space, cover supporting means for supporting said cover structure so that said plate members are movable up and down between a first position where said plate members are disposed to have respective one ends disposed so as to be near mutually to face each other at the central portion of the body in the direction of the width of the body and respective outer surfaces positioned at substantially the same level as an outer surface of the exterior panel member, and a second position where said plate members are disposed to be lower than an inner surface of the exterior panel member with said respective one ends disposed so as to be near mutually to face each other, and further so that said plate members are movable also in a direction of the length of the body between said second position and a third position where said plate members are disposed below the inner surface of the exterior panel member to have said respective one ends kept away from a windshield as a result of rotation of each of said plate members at an axis provided at the other end of said plate member, said axis being substantially perpendicular to the outer surface of said plate member, and driving means for driving said cover structure through said cover supporting means to keep said cover structure at said first position and thereby to close the hollow space so that the windshield wiper is concealed when the windshield wiper is in an inoperative state and placed in the hollow space and to keep said cover structure at said third position and thereby to open the hollow space when the windshield wiper operates.

2. An arrangement according to claim 1, wherein said cover supporting means includes a pair of actuators for moving respectively said plate members upward and downward, and said plate members are rotatably attached to said actuators, respectively.

3. An arrangement according to claim 2, wherein each of said actuators is provided with a plunger engaging at its end portion with a receiving portion provided on each of said plate members to support one of said plate members, said receiving portion being coupled through an engaging spring member with said end portion of the plunger to be rotatable.

4. An arrangement according to claim 2, wherein said actuators are positioned at locations near right and left side lower portions of the windshield, respectively.

5. An arrangement according to claim 3, wherein said end portion of the plunger includes a stepped nut coming in contact with said receiving portion provided on each of said plate members and a support plate included in said cover supporting means is provided to engage with a portion of said plunger below said stepped nut.

6. An arrangement according to claim 2, wherein each of said plate members is provided with guide means on its under surface at another end portion thereof distant from said one end portion at which the plate member is mounted on the body, said guide means being engaged with a guide member included in said cover supporting means and extending in the direction of the width of the body.

7. An arrangement according to claim 6, wherein said driving means includes an additional actuator for moving said plate members to open and close the hollow space, and said guide member is connected with said additional actuator to be movable in a direction of the length of the body.

8. An arrangement according to claim 6, wherein said guide member is positioned at a central portion of the body in the direction of the width of the body.

9. An arrangement according to claim 7, wherein said guide member is provided with a supplemental arm member engaging with a guide hole, which is formed on a suppport plate member provided on the body to extend in the direction of the length of the body, said arm member being slid along said guide hole.

10. An arrangement according to claim 9, wherein said additional actuator is supported by said support plate member and said support plate member is included in said cover supporting means to be movable up and down together with said plate members.

11. An arrangement according to claim 8, wherein said driving means includes an additional actuator for moving said plate members to open and close the hollow space, and said guide member is connected with said additional actuator to be movable in a direction of the length of the body.

12. An arrangement according to claim 11, wherein said guide member is provided with a supplemental arm member engaging with a guide hole, which is formed on a support plate member provided on the body to extend in the direction of the length of the body, said arm member being slid along said guide hole.

13. An arrangement according to claim 11, wherein said additional actuator is provided with a plunger connected at its end portion with a central portion of said guide member.

14. An arrangement according to claim 12, wherein said additional actuator is supported by said support plate member and said support plate member is included in said cover supporting means to be movable up and down together with said plate members.

15. An arrangement according to claim 2, wherein said cover supporting means further including a support plate engaging with said actuators for moving respectively said plate members upward and downward and said driving means includes an additional actuator for moving said plate members to open and close the hollow space, said actuators for moving respectively said plate members upward and downward being mounted on the body and said additional actuator for moving said plate members to open and close the hollow space being supported by said support plate.

16. An arrangement according to claim 1, wherein said cover supporting means includes a pair of first actuators for moving respectively said plate members upward and downward and a guide member extending in a direction of the width of the body for guiding said plate members, said driving means includes a second actuator for moving said plate members to open and close the hollow space, said plate members are attached, at respective end portions thereof adjacent to the right and left sides of the body, to said first actuators respectively to be rotatable, and each of said plate members is provided with guide means on another end portion thereof distant from said one end portion at which the plate member is attached to said first actuator, said guide means being engaged with said guide member to be slidable and said guide member being moved by said second actuator in a direction of the length of the body.

17. An arrangement according to claim 16, wherein said driving means further includes a wiper driving control portion for controlling the operation of the windshield wiper and further supplying a current for causing said first and second actuators to operate selectively and an actuator driving control portion for controlling the current supplied to said first and second actuators in response to positions of the windshield wiper.

18. An arrangement for concealing a windshield wiper of an automobile comprising:
a structural portion for forming a hollow space for receiving the windshield wiper between an exterior panel member and a windshield in a body of the automobile,
a cover structure including a pair of separate plate members which are positioned over the hollow space to be capable of being arranged close to each other in a direction of the width of the body so as to cover the hollow space,
first driving means for moving said cover structure up and down between a first position where each of said plate members is disposed to have its outer surfaces positioned at substantially the same level as an outer surface of the exterior panel member and a second position where each of said plate members is disposed to be lower than an inner surface of the exterior panel member with each plate member having a rear portion positioned near a windshield,
second driving means for moving said cover structure in a direction of the length of the body between said second position and a third position where each of said plate members is disposed to cause at least a part of its front portion to be positioned under the inner suface of the exterior panel member so that at least a part of said rear portion of the plate member is kept away from the windshield, and
means for controllably moving said first and second driving means sequentially to position said cover structure at said first position and thereby to close the hollow space so that the windshield wiper is concealed when the windshield wiper is in an inoperative state and put in the hollow space and to position said cover structure at said third position and thereby to open the holllow space when the windshield wiper operates.

19. An arrangement according to claim 18, wherein each of said plate members is supported at one end portion by a rotatable axis on a cover supporting means, said rotatable axis being substantially perpendicular to the outer surface of said plate member.

20. An arrangement according to claim 19, wherein each of said plate members is supported also to be movable up and down by said cover supporting means at said one end portion.

21. An arrangement according to claim 20, wherein said cover supporting means includes a pair of actuators for moving respectively said plate members upward and downward, and each of said plate members are rotatably attached to one of said actuators respectively.

22. An arrangement according to claim 21, wherein each of said actuators is provided with a plunger engaging at its end portion with a receiving portion provided on each of said plate portions to support one of said plate members, said receiving portion being rotatably coupled through an engaging spring member with said end portion of the plunger.

23. An arrangement according to claim 21, wherein said actuators are positioned at locations near right and left side lower portions of the windshield, respectively.

24. An arrangement according to claim 19, wherein each of said plate members is provided with guide means on its under surface at another end portion, said guide means being engaged with a guide member included in said cover supporting means and extending in the direction of the width of the body.

25. An arrangement according to claim 24, wherein said first and second driving means include actuators respectively for moving said plate members to open and close the hollow space, and said guide member is connected with said second driving means actuator to be movable in the direction of the length of the body.

26. An arrangement according to claim 24, wherein said guide member is positioned at a central portion of the body in the direction of the width of the body.

* * * * *